(12) United States Patent
Hur et al.

(10) Patent No.: US 10,566,617 B2
(45) Date of Patent: Feb. 18, 2020

(54) MICROBATTERY

(71) Applicant: The Regents of the University of California, Oakland, CA (US)

(72) Inventors: Janet Hur, Los Angeles, CA (US); Leland Smith, Los Angeles, CA (US); Bruce S. Dunn, Los Angeles, CA (US); Chang-Jin Kim, Beverly Hills, CA (US)

(73) Assignee: The Regents of the University of California, Oakland, CA (US)

( * ) Notice: Subject to any disclaimer, the term of this patent is extended or adjusted under 35 U.S.C. 154(b) by 121 days.

(21) Appl. No.: 15/554,062

(22) PCT Filed: Mar. 2, 2016

(86) PCT No.: PCT/US2016/020385
§ 371 (c)(1),
(2) Date: Aug. 28, 2017

(87) PCT Pub. No.: WO2016/141027
PCT Pub. Date: Sep. 9, 2016

(65) Prior Publication Data
US 2018/0241035 A1 Aug. 23, 2018

Related U.S. Application Data

(60) Provisional application No. 62/126,777, filed on Mar. 2, 2015.

(51) Int. Cl.
*H01M 4/38* (2006.01)
*H01M 10/04* (2006.01)
(Continued)

(52) U.S. Cl.
CPC ......... *H01M 4/386* (2013.01); *H01M 4/0407* (2013.01); *H01M 4/0471* (2013.01);
(Continued)

(58) Field of Classification Search
None
See application file for complete search history.

(56) References Cited

U.S. PATENT DOCUMENTS

| 7,008,564 B2 * | 3/2006 | Harrup ................. H01M 4/621 252/500 |
| 7,618,748 B2 | 11/2009 | Nathan et al. |
| 2011/0027648 A1 | 2/2011 | Rolison et al. |

FOREIGN PATENT DOCUMENTS

| JP | 11-111336 | * | 4/1999 |
| WO | 2013019489 A1 | | 2/2013 |

OTHER PUBLICATIONS

"Technical Information," Front Edge Technology, Inc., accessed Feb. 11, 2015, Available online at: <<http://www.frontedgetechnology.com/tech.htm>>, 5 pages.
(Continued)

*Primary Examiner* — Jonathan Crepeau
(74) *Attorney, Agent, or Firm* — Withrow & Terranova, P.L.L.C.

(57) ABSTRACT

Disclosed is a microbattery having a substrate with a surface that includes an array of posts extending from the surface of the substrate to form a first electrode. An selectively-cured electrolyte forms a conformal coating over the surface of the substrate and the array of posts to provide a coated electrode. A second electrode substantially encases the coated electrode.

64 Claims, 9 Drawing Sheets

(51) Int. Cl.

| | |
|---|---|
| H01M 10/0565 | (2010.01) |
| H01M 4/04 | (2006.01) |
| H01M 4/134 | (2010.01) |
| H01M 10/058 | (2010.01) |
| H01M 4/1395 | (2010.01) |
| H01M 4/40 | (2006.01) |
| H01M 10/0525 | (2010.01) |
| H01M 4/02 | (2006.01) |

(52) U.S. Cl.
CPC ......... *H01M 4/134* (2013.01); *H01M 4/1395* (2013.01); *H01M 4/405* (2013.01); *H01M 10/0436* (2013.01); *H01M 10/058* (2013.01); *H01M 10/0525* (2013.01); *H01M 10/0565* (2013.01); *H01M 2004/021* (2013.01); *H01M 2004/025* (2013.01); *H01M 2300/0082* (2013.01); *H01M 2300/0085* (2013.01)

(56) References Cited

OTHER PUBLICATIONS

"Rechargeable Lithium-Ion Button Cells—CoinPower®," Varta Microbattery, accessed Feb. 11, 2015, Available online at: <<http://www.varta-microbattery.com/en/products/batteries-cells-configurations/technology/rechargeable/lithium-button-cells/all/technology-description.html>>, 2 pages.

Asakawa, K., et al., "GaAs and AlGaAs Anisotropic Fine Pattern Etching Using a New Reactive Ion Beam Etching System," Journal of Vacuum Science and Technology B, vol. 3, No. 1, Jan./Feb. 1985, pp. 402-405.

Arthur, T. S. et al., "Three-dimensional electrodes and battery architectures," MRS Bulletin, vol. 36, Jul. 2011, Materials Research Society, pp. 523-531.

Baranchugov, V., et al., "Amorphous silicon thin films as a high capacity anodes for Li-ion batteries in ionic liquid electrolytes," Electrochemistry Communications, vol. 9, No. 4, Apr. 2007, pp. 796-800.

Chan, C.K., et al. "High-Performance Lithium Battery Anodes Using Silicon Nanowires," Nature Nanotechnology, vol. 3, Dec. 16, 2007, pp. 31-35.

Cirigliano, N., "Primary and Secondary Three Dimensional Microbatteries," Dissertation submitted in partial satisfaction of requirements for the degree Doctor of Philosophy in Materials Science and Engineering, University of California Los Angeles, Available online at: <<https://escholarship.org/uc/item/5pv4f0d9>>, Jan. 1, 2013, 216 pages.

Cirigliano, N., et al., "3D Architectured Anodes for Lithium-Ion Microbatteries with Large Areal Capacity," Energy Technology, vol. 2, No. 4, Apr. 6, 2014, pp. 362-369.

Desbiens, Jean-Philippe, et al., "ArF Excimer Laser Micromachining of Pyrex, SiC and PZT for Rapid Prototyping of MEMS Components," Sensors and Actuators A, vol. 136, No. 2, May 16, 2007, pp. 554-563.

Nathan, M., et al., "Three-Dimensional Thin-Film Li-Ion Microbatteries for Autonomous MEMS," Journal of Microelectromechanical Systems, vol. 14, No. 5, Oct. 2005, pp. 879-885.

Nitta, N., et al., "High-Capacity Anode Materials for Lithium-Ion Batteries: Choice of Elements and Structures for Active Particles," Particle and Particle Systems Characterization, vol. 31, No. 3, Mar. 1, 2014, pp. 317-336.

Perre, E., et al., "Electrodeposited Cu(2)Sb as Anode Material for 3-Dimensional Li-Ion Microbatteries," Journal of Material Research, vol. 25, No. 8, Aug. 2010, pp. 1485-1491.

Pham, N.P. et al. "Photoresist Coating Methods for the Integration of Novel 3-D RF Microstructures," Journal of Microelectromechanical Systems, vol. 13, No. 3, Jun. 2004, pp. 491-499.

Pikul, J.H., et al., "High Power Lithium Ion Micro Batteries from Interdigitated Three-Dimensional Bicontinuous Nanoporous Electrodes," Nature Communications, vol. 4, Apr. 16, 2013, 5 pages.

Shaijumon, M.M., "Nanoarchitectured 3D Cathodes for Li-Ion Microbatteries," Advanced Materials, vol. 22, No. 44, Sep. 13, 2010, pp. 4978-4981.

Sun, K., et al., "3D Printing of Interdigitated Li-Ion microbattery Architectures," Advanced Materials, vol. 25, No. 33, Sep. 6, 2013, pp. 4539-4543.

Valvo, M., et al., "Electrochemical elaboration of electrodes and electrolytes for 3D structured batteries," Journal of Materials Chemistry A, vol. 1, No. 32, Jun. 21, 2013, pp. 9281-9293.

Wang, C., et al., "Carbon-MEMS architectures for 3D microbatteries," Proceedings of the SPIE 5455, MEMS, MOEMS, and Micromachining, vol. 5455, Aug. 16, 2004, SPIE, 8 pages.

Wen, C. J., et al., "Chemical Diffusion in Intermediate Phases in the Lithium-Silicon System," Journal of Solid State Chemistry, vol. 37, No. 3, May 1981, pp. 271-278.

Whittingham, M. S., "Lithium Batteries and Cathode Materials," Chemical Reviews, vol. 104, No. 10, Sep. 14, 2004, pp. 4271-4301.

Zhang, W.-J., "A Review of the Electrochemical Performance of Alloy Anodes for Lithium-Ion Batteries," Journal of Power Sources, vol. 196, No. 1, Jan. 1, 2011, pp. 13-24.

International Search Report and Written Opinion for International Patent Application No. PCT/US2016/020385, dated Aug. 25, 2016, 14 pages.

International Preliminary Report on Patentability for International Patent Application No. PCT/US2016/020385, dated Sep. 14, 2017, 11 pages.

* cited by examiner

MICROBATTERY

RELATED APPLICATIONS

This application is a 35 USC 371 national phase filing of International Application No. PCT/US2016/020385, filed Mar. 2, 2016, which claims the benefit of provisional patent application Ser. No. 62/126,777, filed Mar. 2, 2015, the disclosures of which are hereby incorporated herein by reference in their entireties.

This invention was made with Government support under Grant No. N00014-11-1-0673, awarded by the United States Navy, Office of Naval Research. The Government has certain rights in this invention.

FIELD OF THE DISCLOSURE

The present disclosure generally relates to electrical energy sources that have millimeter square to centimeter square footprints and more specifically to a three-dimensional (3D) microbattery.

BACKGROUND

Although microelectronics have already advanced to offer various functions such as sensing, analysis, and communication, there has not been a proper power source to supply enough energy to the system for these microsystems to operate standing alone. By simply miniaturizing the commonly used thin-film two-dimensional (2D) battery design into an area no more than a few square millimeters to fit this purpose, not enough energy is stored in the limited areal footprint. Due to a very small active mass available in a reduced area, current state-of-the-art thin-film microbatteries have 0.2 mAh/$cm^2$ of capacity and still occupy an area of 5 $cm^2$ instead of a few square millimeters. What is needed is a new microbattery that provides an increase in the energy density in microbattery systems without sacrificing the high power density of thin-film batteries.

SUMMARY

Disclosed is a microbattery having a substrate with a surface that includes an array of posts extending from the surface of the substrate to form a first electrode. A selectively-cured electrolyte forms a conformal coating over the surface of the substrate and the array of posts to provide a coated electrode. A second electrode substantially encases the coated electrode.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
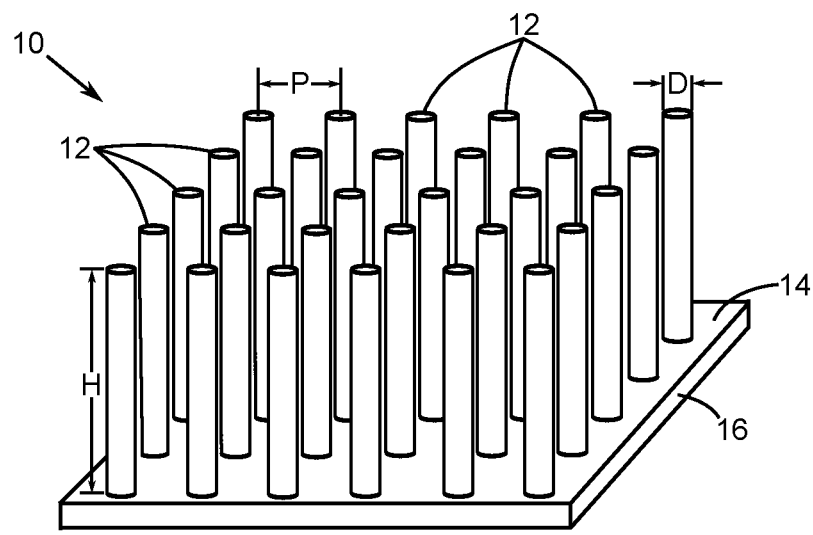
FIG. 1 is a structural diagram of a first electrode having an array of posts extending from a surface of a substrate.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 is a structural diagram of a first electrode 10 having an array of posts 12 extending from a surface 14 of a substrate 16. The array of posts 12 has a pitch P between posts that ranges from around 20 μm to around 2000 μm. A minimum value for the pitch P between posts is around twice a diameter D of each post. In some embodiments, the diameter D of the posts ranges from about 10 μm to about 100 μm while the pitch P between posts ranges from about 20 μm to about 200 μm. In other embodiments, the diameter D of the posts ranges from 100 μm to about 300 μm while the pitch P between posts ranges from 200 μm to about 600 μm. In yet other embodiments, the diameter of the posts ranges from 300 μm to about 500 μm while the pitch P between posts ranges from 600 μm to 1000 μm. In still other embodiments, the diameter of the posts ranges from 500 μm to about 1000 μm while the pitch P between posts ranges from 1000 μm to 2000 μm. A post height H is generally only limited by fabrication processes and materials for the posts. In exemplary embodiments, the post height H for the posts ranges from around 350 μm to around 450 μm. Posts in which the post height H is outside this range are achievable with certain semiconductor processing and/or micro-electromechanical manufacturing techniques.

An exemplary embodiment of the first electrode 10 has a 3 mm by 3 mm area for the surface 14 to accommodate 17 rows by 17 columns of posts having the diameter D equal to 100 μm. Another exemplary embodiment of the first electrode 10 accommodates 34 rows by 34 columns of posts having the diameter D equal to 50 μm on a 3 mm by 3 mm area of surface 14. In both of these exemplary embodiments, the height of each of the posts is around 400 μm.

In an exemplary embodiment of the first electrode 10, the substrate 16 and array of posts 12 are both made of silicon that is highly doped to provide a resistivity within a range of 0.001 Ω-cm to around 0.005 Ω-cm. This low resistivity allows an elimination of a separate metal current collector for each post. Furthermore, impedance testing shows that not only is electronic resistance desirably reduced, but charge transfer within the first electrode 10 is also desirably reduced. While silicon is a common material for fabricating the first electrode 10, it is to be understood that other semiconductor materials such as germanium, metals such as aluminum and carbonaceous materials such as graphite are also usable. Another resistivity range for the array posts 12 and the substrate 16 ranges from 0.005 Ω-cm to around 0.5 Ω-cm. Yet, another resistivity range for the array posts 12 and the substrate 16 ranges from 0.1 Ω-cm to around 20 Ω-cm.

The choice of material is somewhat dependent upon fabrication techniques for creating the array of posts 12. For example, micromachining techniques including etching, laser cutting, microdrilling or a combination thereof is usable to fabricate the array of posts 12 from various electrically conductive materials. Laser cutting or microdrilling are convenient techniques for fabricating the array of posts 12 from metal, while etching is convenient for fabricating the array of posts 12 from either silicon or germanium. However, micromachining can be used in finishing steps such as polishing regardless of the fabrication technique used to initially create the array of posts 12. It is conceivable that the array of posts 12 do not necessarily need to be made of the same material as the substrate 16. However, as detailed later, photolithography, chemical etching and dry etching techniques in common use in the semiconductor industry is a relatively very convenient technique for manufacturing the first electrode 10 made of the same material as the substrate.

Figure 2:
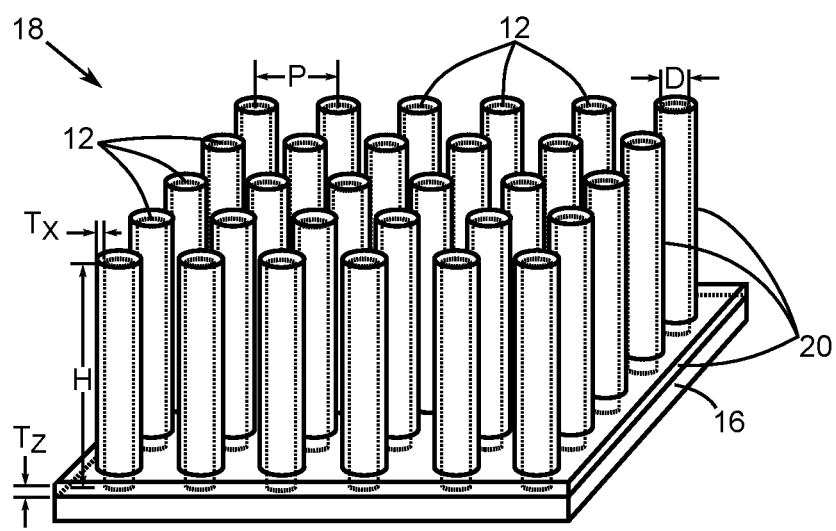
FIG. 2 is a structural diagram of a coated electrode having a selectively-cured electrolyte that forms a conformal coating over the array of posts and the surface of the substrate.

FIG. 2 is a structural diagram of a coated electrode 18 having a selectively-cured electrolyte 20 that forms a conformal coating over the array of posts 12 and the surface 14 of the substrate 16. In some embodiments, the selectively-cured electrolyte 20 is made of a ultra-violet (UV) cured photoresist that is soaked in a liquid electrolyte containing a lithium salt. A microscale or nanoscale porosity of the selectively-cured electrolyte 20 allows for the infiltration of additional ion-conducting species. The photoresist is a passivation material that functions as an electrical insulator. The selectively-cured electrolyte 20 has sufficient chemical stability to withstand the reducing environment at the anode and the oxidizing environment at the cathode. The photoresist can be either the positive or the negative type. However, it is to be understood that while examples of the selectively-cured electrolyte 20 are cured photoresists, polymers other than photo-curable polymers are usable to realize the selectively-cured electrolyte 20. For example, some polymers are selectively cured by heat emanating from the surface of the posts of the array of posts 12 or by a chemical functionalization applied to the surface of the posts. In one embodiment, the selectively-cured electrolyte 20 includes pores in the range of 1 nm to 10 nm to allow ingress of liquid electrolytes. In another embodiment, the selectively-cured electrolyte 20 includes pores in the range of 10 nm to 100 nm to allow ingress of liquid electrolytes.

The selectively-cured electrolyte 20 has a post coating thickness Tx around each of the posts making up the array of posts 12. The post coating thickness Tx typically ranges between 1 μm and 10 μm. The selectively-cured electrolyte 20 also has a surface coating thickness Tz that coats the surface 14 of the substrate 16. The surface coating thickness Tz typically ranges between 1 μm and 10 μm. The post coating thickness Tx and the surface coating thickness Tz are equal in some embodiments.

Figure 3:
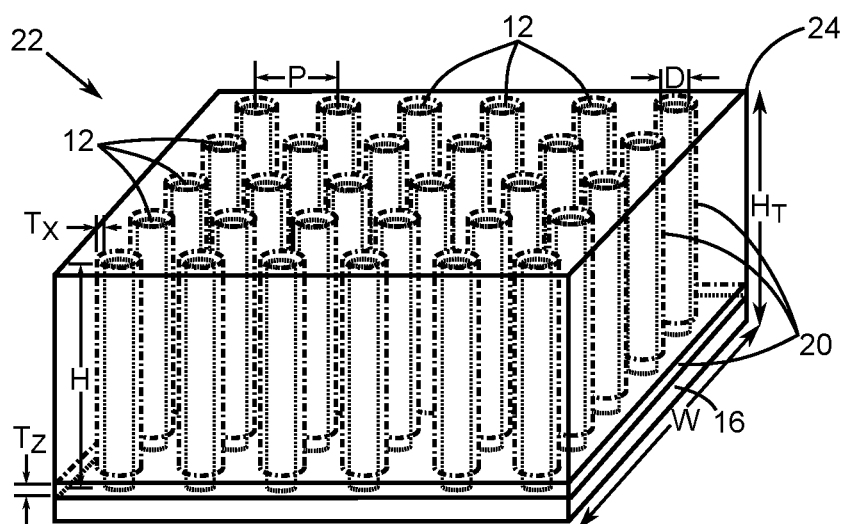
FIG. 3 is a structural diagram of a microbattery having a second electrode that substantially encases the coated electrode.

FIG. 3 is a structural diagram of a microbattery 22 having a second electrode 24 that substantially encases the coated electrode 18 (FIG. 2). In an exemplary embodiment, the second electrode 24 serves as a cathode while the first electrode 10 (FIG. 1) serves as an anode. However, it is to be understood that in some embodiments the first electrode 10 can be the cathode and the second electrode 24 can be the anode.

In an exemplary embodiment, the first electrode 10 is an anode in which the array of posts 12 includes 17 rows and 17 columns of silicon posts that each has a diameter D equal to 100 µm. In this particular case, the first electrode 10 has a capacity for lithium insertion that exceeds 10 milliampere-hour per centimeter squared (mAhr/cm$^2$).

As a result of relatively good mechanical integrity provided by the silicon posts 12 and the selectively-cured electrolyte 20, there are relatively few mechanical requirements for cathode materials making up the second electrode 24. As such, cathode materials usable for the second electrode 24 are not limited to solids, and include liquids and gels. Exemplary embodiments use either solid or gel cathode materials that have a relatively negligible vapor pressure to realize the second electrode 24. The mechanical integrity is only one aspect. The 3D structure of the array of posts 12 coated with the selectively-cured electrolyte 20 also provides other benefits such as high surface area and short diffusion lengths for lithium ions in the second electrode 24.

In some exemplary embodiments, the cathode material is initially a slurry mixture containing 70% to 95% of active materials that include, but are not limited to, metal oxides, metal phosphates, metal sulfides, sulfur and any combination thereof. A remaining 5% to 30% of the slurry mixture is made up of additives that improve mechanical properties, electrical conductivity, and ionic conductivity of the second electrode 24. Mechanical integrity is improved by including various polymer binders as additives. An example of one such polymer binder is polyvinylidene fluoride (PVDF). Electrical conductivity is increased by carbon-based additives such as graphites and carbon blacks. Ionic conductivity is increased with supporting electrolyte additives such as polymers that include poly(methyl methacrylate) and polyethylene oxide; salts such as lithium perchlorate (LiClO$_4$), lithium tetrafluoroborate (LiBF$_4$), and LiCF$_3$SO$_2$NLiSO$_2$CF$_3$; low vapor pressure solvents such as ionic liquids, carbonates, glycols and glycols terminated with methyl ether groups (glymes); and any combination thereof. In one specific exemplary embodiment an initial composition of the slurry mixture was tested using 80% LiNi$_{0.8}$Co$_{0.15}$Al$_{0.05}$O$_2$ (NCA, NEI Corporation), 10% graphite (TIMCAL KS4), 5% LiClO$_4$ in propylene carbonate (concentration is 1 molar) and 5% PVDF. This exemplary slurry is introduced into voids between the posts of the array of posts 12 coated with the selectively-cured electrolyte 20 using a carrier solvent, such as n-methylpyrrolidinone, methyl isobutyl ketone, acetone or acetonitrile. More generally, the second electrode comprises a mixture of active lithium-storage materials, ionically conducting materials, and electrically conducting materials within a matrix of mechanically supportive materials.

The microbattery 22 has two to three times the volumetric energy density of coin cell batteries and thin-film cell batteries that have two-dimensional (2D) electrode geometry. 2D electrode geometry is structurally very inefficient for packaging active materials into a microbattery. As a result, batteries with 2D electrode geometry have an inherent tradeoff between energy and power. In contrast to the 2D electrode geometry of coin cell batteries and thin-film cell batteries, the microbattery 22 is considered a three-dimensional (3D) battery because length L, width W, total height H$_T$, and array of posts 12 of the microbattery 22 provide a relatively very efficient structure for packaging active materials. In an exemplary embodiment, the length L is around 3 mm, the width W is around 3 mm, and the total height H$_T$ is around 600 µm. In some embodiments, the length L of the first electrode and the width of the first electrode both range from about 1 mm to around 10 mm. In other embodiments, the length L of the first electrode and the width of the first electrode both range from about 10 mm to around 100 mm.

The microbattery 22 has a similar energy density per volume of efficient batteries such as cellular telephone batteries that are much larger than coin cell batteries and thin-film batteries. Thus, the microbattery 22 does not present the same inherent tradeoff between energy and power as suffered by coin cell batteries and thin-film cell batteries and other related types of miniature and microbatteries. In one embodiment, the microbattery 22 has an areal energy density of around 42 mWh/cm$^2$ with around a 3 V working voltage. In another embodiment, the microbattery 22 has a volumetric energy density of around 850 mWh/cm$^3$ with around a 3 V working voltage.

Further still, the microbattery 22 is rechargeable from sources such as energy harvesting systems that include vibrational energy harvesting systems, photovoltaic energy harvesting systems, and thermoelectric energy harvesting systems. As such, the microbattery 22 is relatively ideally suited for use in self-powered devices on the so-called Internet of Things (IoT). It is also envisioned that the microbattery 22 is usable to power hearing aids and other miniature medical device including implantable medical devices. The microbattery 22 is electrically connected to loads by way of current collection terminals (FIG. 6) that are fixed to the first electrode 10 and the second electrode 24. The current collection terminals are typically made of relatively planar sheets of copper, nickel or stainless steel. In the exemplary embodiments depicted in this disclosure, the first electrode 10 serves as an anode and the second electrode 24 serves as a cathode. However, it is to be understood that it is envisioned that some chemistries allow for the first electrode 10 to serve as a cathode and the second electrode 24 to serve as an anode.

Figure 4:
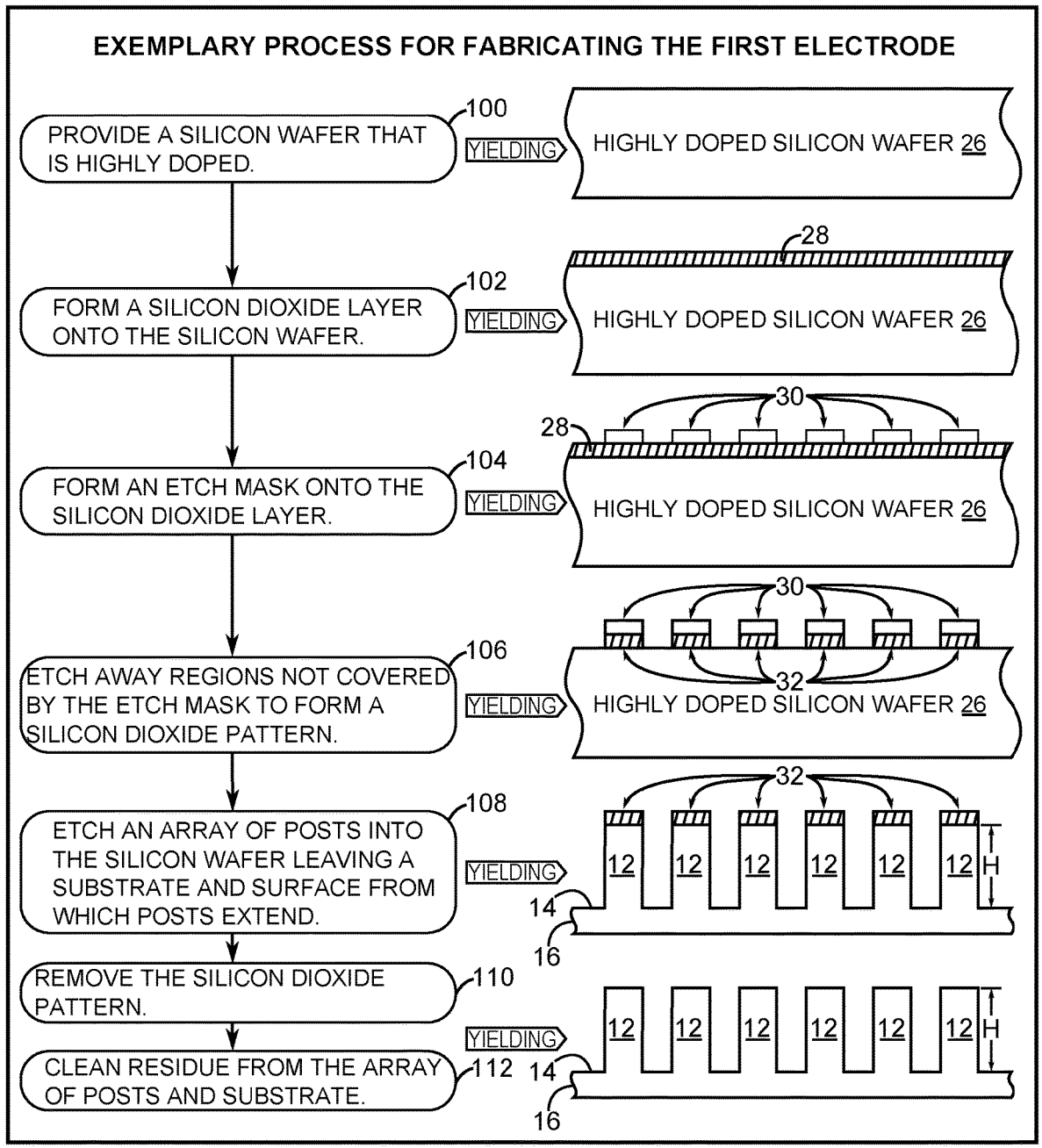
FIG. 4 is diagram of an exemplary process for fabricating the first electrode.

FIG. 4 is diagram of an exemplary process for fabricating the first electrode 10. The exemplary process begins with providing a silicon wafer 26 that is highly doped (step 100). High doping levels provide an electrical conductivity that ranges from around 0.001 Ω-cm to around 0.005 Ω-cm throughout the silicon wafer 26. A next step involves depositing an etch mask layer that is typically a polymer or dielectric layer such as a silicon dioxide (SiO$_2$) layer 28 onto the silicon wafer 26 (step 102). In an exemplary embodiment the silicon dioxide layer 28 is 4 µm thick. In the exemplary embodiment, the silicon dioxide layer 28 is deposited using plasma-enhanced chemical vapor deposition (PECVD).

An etch mask 30 is then added over the silicon dioxide layer 28 (step 104). The etch mask 30 is an array of circles that define a top view profile of an eventual array of posts. The etch mask 30 is typically made up of a photoresist that is patterned with UV light. In the exemplary process, the photoresist is a positive type that when exposed to light becomes soluble to a photoresist developer solution. A present example of a positive photoresist suitable for use with embodiments of the present disclosure is known in the semiconductor industry as AZ5214. Regions of the positive photoresist making up the etch mask 30 that are not exposed to light prevent silicon dioxide regions that are directly underneath from being etched away by a silicon dioxide etchant. The process continues with etching away regions of the silicon dioxide layer 28 not covered by the etch mask 30 to form a silicon dioxide pattern 32 that duplicates the array of circles that define the profile of the eventual array of posts (step 106). An exemplary etching technique is dry etching of $SiO_2$ using plasma.

Next, the array of posts 12 is fabricated by etching partially through the silicon wafer 26 and around regions protected from etching by the silicon dioxide pattern 32 (step 108). In this case, the silicon dioxide pattern 32 serves as an etch mask. Anisotropic etching of the silicon is accomplished using a deep reactive ion etcher (DRIE) until the post height H is achieved. In embodiments fabricated by this exemplary process, the post height H for the posts ranges from around 350 μm to up to around 450 μm. Other ranges for the post height H ranges from around 100 μm to about 350 μm, and from 350 μm to around 1000 μm.

The process nears completion by removing the remaining silicon dioxide making up the silicon dioxide pattern using hydrofluoric (HF) acid (step 110). The first electrode 10 is then completed by cleaning the array of posts 12 of polymer residue using an organic film stripper and residue remover (step 112).

Figure 5:
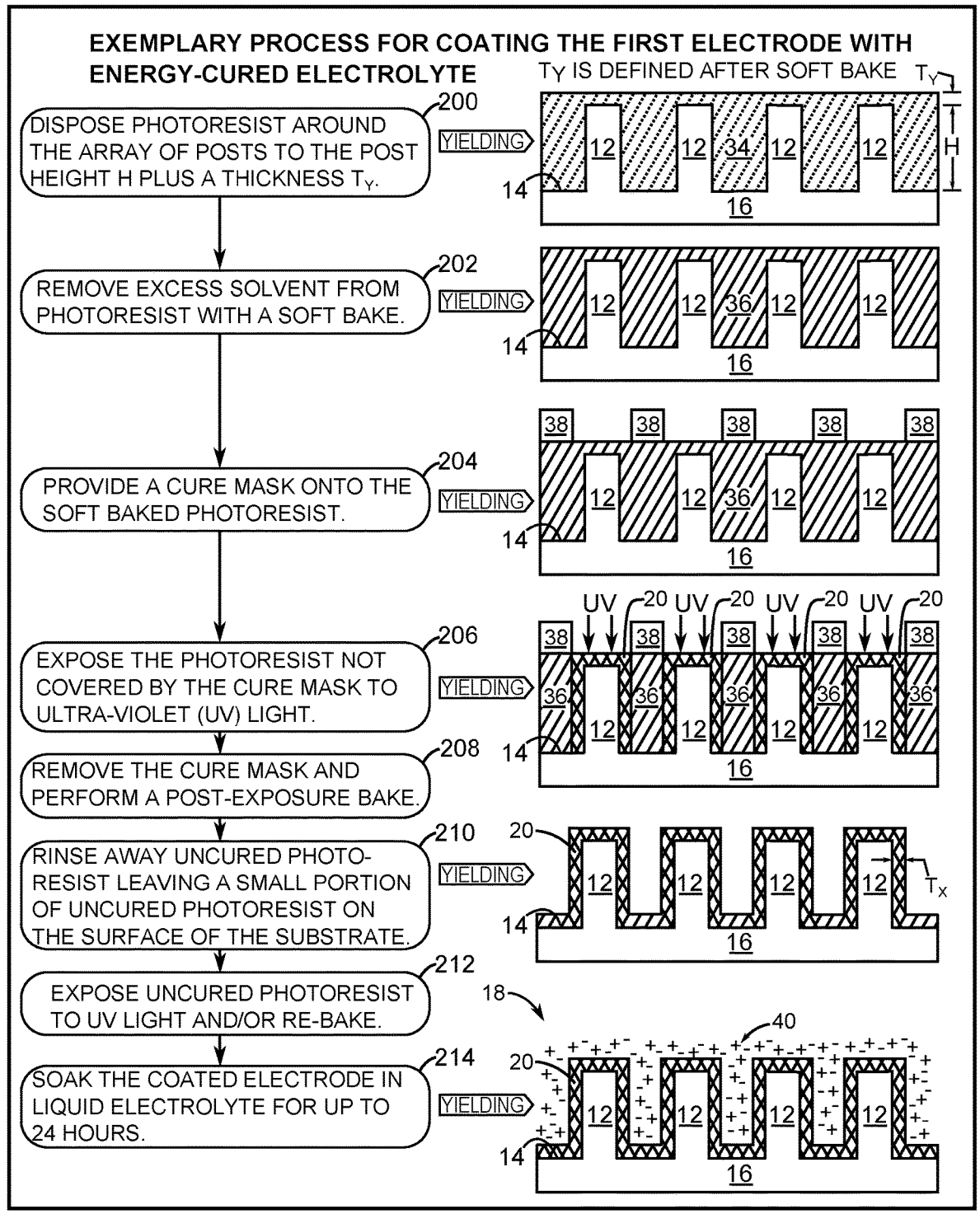
FIG. 5 is a diagram of an exemplary process for coating the array of posts and the surface of the substrate with a conformal coat of the selectively-cured electrolyte.

FIG. 5 is a diagram of an exemplary process for conformally coating the array of posts 12 and the surface of the substrate 16 with the selectively-cured electrolyte 20. The process begins with disposing a photoresist 34 around the array of posts 12 to the post height H plus a thickness $T_Y$ (step 200). The thickness $T_Y$ in this exemplary embodiment is chosen to result in a selectively-cured electrolyte thickness of 1-10 μm that covers tops of the posts in the array of posts 12. After a softbake, the thickness $T_Y$ reduces significantly to result in the selectively-cured electrolyte thickness of 1-10 μm.

In an exemplary embodiment, the photoresist 34 is a negative type known as SU-8 that comprises bisphenol A Novolac epoxy dissolved in an organic solvent. The organic solvent is typically gamma-butyrolactone (GBL) or cyclopentanone. In some embodiments, the organic solvent cyclopentanone has improved adhesion to the array of posts 12 over GBL. Up to 10 wt % of mixed Triarylsulfonium/hexafluoroantimonate salt also comprises the SU-8 formulation of photoresist 34 as the photoacid generator. It is to be understood that other photoacid generators are known in the art. In some exemplary embodiments, the photoresist 34 is SU-8 3010.

The next step involves removing the excess organic solvent from the photoresist 34 by conducting a soft bake (step 202). The soft bake results in baked photoresist 36. In some embodiments, to reduce cracking, the soft bake can proceed with a first temperature hold of 65° C. before a ramp up to a second temperature hold of 95° C. The second temperature hold is dependent on the total thickness of the selectively-cured electrolyte 20 after soft bake, which is $H+T_X$(final) and typically ranges from around 360 μm to around 460 μm. In at least one embodiment, the second temperature hold lasts around 8 hours.

A cure mask 38 is then applied to a top surface of the baked photoresist 36 (step 204). The cure mask 38 is a negative-like image of the etch mask 30 (FIG. 4). In at least one embodiment, the cure mask 38 is a glass plate with a chrome pattern that is brought very near to the top surface of the baked photoresist 36. The cure mask 38 is registered with a registration mark (not shown) on the silicon wafer 26 (FIG. 4) such that spacing of masked regions are centered between the pitch of the posts of the array of posts 12. The cure mask 38 is dimensioned such that the post coating thickness Tx is unmasked around each post of the array of posts 12. In an exemplary embodiment, the cure mask 38 includes an array of openings through which ultra-violet (UV) light is transmitted to cure exposed portions of the baked photoresist 36. In an exemplary embodiment, the openings of the array of openings are circular with a diameter that ranges from about 102 μm to about 120 μm.

A next step involves exposing unmasked portions of the baked photoresist 36 to energy in the form of ultra-violet (UV) light (step 206). The UV light selectively cures the unmasked portions of the baked photoresist 36 to create the selectively-cured electrolyte 20. An exposure dose of UV light is adjustable depending on geometry and ambient environmental conditions. In an exemplary embodiment, an exposure of around 75 seconds is shown to be effective in producing an acceptable sample of the selectively-cured electrolyte 20 having a post height H equal to 410 μm. At this point, the selectively-cured electrolyte 20 has acid generated in UV activated regions.

A following step involves removing the cure mask 38 and baking the selectively cured electrolyte 20 at 95° C. on a hotplate for around 10 minutes to crosslink the epoxy polymer (step 208). Another step involves rinsing away the uncured baked photoresist 36 while leaving a small portion of the uncured baked photoresist 36 onto the surface 14 of the substrate 16 (step 210). In an exemplary embodiment, the baked photoresist 36 that remains uncured is stirred and rinsed away from the selectively-cured electrolyte 20 using a photoresist developing solution. A photoresist developing solution for SU-8 photoresist is 1-methoxy-2-propanol acetate. Development time is typically a function of total thickness ($H+T_Y$) of the selectively-cured electrolyte 20. Typically, a relatively rigorous rinsing of the array of posts 12 for 5 minutes to 7 minutes will leave between 50 μm to 100 μm of uncured baked photoresist 36 onto the surface 14 of the substrate 16.

Next, the uncured baked photoresist 36 can be exposed to UV light and/or re-baked (step 212). The baked photoresist 36 on the surface 14 can be relatively difficult to fully develop due to difficulty in getting the developer to reach the surface 14 of the substrate 16 due to narrow gaps between the posts of the array of posts 12. Therefore, in some embodiments having taller features, the surface 14 of the substrate 16 will generally have some thickness of baked photoresist 36 that remains uncured and undeveloped. Nevertheless, the uncured and undeveloped photoresist 36 is electrically insulating and prevents electrical shorts between the first electrode 18 and the second electrode 24 (FIG. 3).

The coated electrode 18 is completed by soaking the selectively-cured electrolyte 20 in a liquid electrolyte 40 that provides enhancement in lithium ion conduction (step 214). In at least one embodiment, a one to two order of magnitude improvement in lithium ion conduction is realized after soaking the selectively-cured electrolyte 20 in the liquid electrolyte 40. In an exemplary embodiment, the liquid electrolyte 40 is propylene carbonate that contains 1 molar lithium perchlorate ($LiClO_4$).

Figure 6:
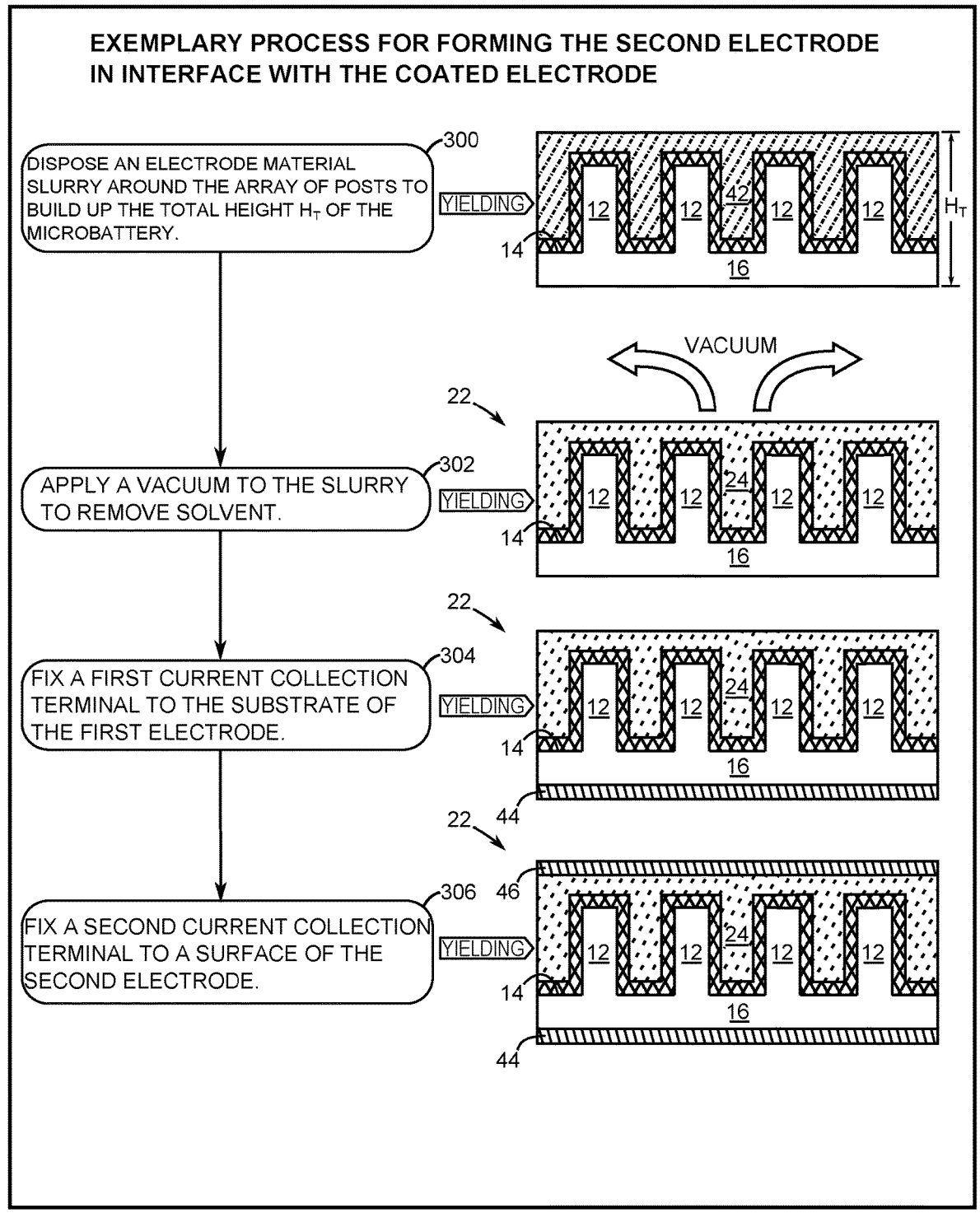
FIG. 6 is a diagram of an exemplary process for forming the second electrode in interface with the coated electrode.

FIG. 6 is a diagram of an exemplary process for forming the second electrode 24 in interface with the coated electrode 18. The process begins with disposing electrode material slurry 42 onto the coated electrode 18 such that the electrode material slurry 42 fills around the posts of the array of posts 12 having the coating of the selectively-cured electrolyte 20 (step 300). The electrode material slurry 42 contains 70% to 95% of active materials that include but are not limited to metal oxides, metal phosphates, metal sulfides, sulfur and any combinations thereof. A remaining 5% to 30% of the electrode material slurry 42 is made up of additives that improve mechanical properties, electrical conductivity, and ionic conductivity of the second electrode 24. Mechanical integrity is improved by including various polymer binders as additives. An example of one such polymer binder is polyvinylidene fluoride (PVDF). Electrical conductivity is increased by carbon-based additives such as graphites and carbon blacks. Ionic conductivity is increased with supporting electrolyte additives such as polymers that include poly(methyl methacrylate) and polyethylene oxide; salts such as lithium perchlorate ($LiClO_4$), lithium tetrafluoroborate ($LiBF_4$), and $LiCF_3SO_2NLiSO_2CF_3$; low vapor pressure solvents such as ionic liquids, carbonates, glycols and glycols terminated with methyl ether groups (glymes); and any combinations thereof. In one specific exemplary embodiment an initial composition of the electrode material slurry 42 was tested using 80% $LiNi_{0.8}Co_{0.15}Al_{0.05}O_2$ (NCA, NEI Corporation), 10% graphite (TIMCAL KS4), 5% $LiClO_4$ in propylene carbonate (concentration is 1 molar) and 5% PVDF. The electrode material slurry is introduced into the voids between the coated posts using a carrier solvent, such as n-methylpyrrolidinone, methyl isobutyl ketone, acetone or acetonitrile.

Next, a vacuum is applied to the ambient environment around the electrode material slurry 42 (step 302). As solvents evaporate from the electrode material slurry 42, the electrode material slurry 42 densifies and converts to a semi-solid that is the second electrode 24. At this point, a first current collection terminal 44 can be fixed to the substrate 16 of the first electrode 18 (step 304) and a second current collection terminal 46 can be fixed to a top surface of the second electrode 24 (step 306).

The array of posts 12 having highly doped silicon posts (FIG. 1) is cycled to an extent of 10% of its theoretical capacity. Common knowledge is that silicon as an anode electrode is not practical due to the high volume expansion during cycling. However, the high volume expansion was caused when the cycling capacity was pushed to the theoretical capacity of silicon. Silicon electrode experiences 50% volume expansion when capacity reaches 954 mAh/g yielding LiSi throughout the electrode. If cycled at 300 mAh/g, less than 10% of the theoretical capacity, the volume expansion will be less than 16%. This is comparable to the volume expansion of widely used graphite anode which is 12%. The array of posts has shown high mechanical integrity after cycling.

Figure 7:
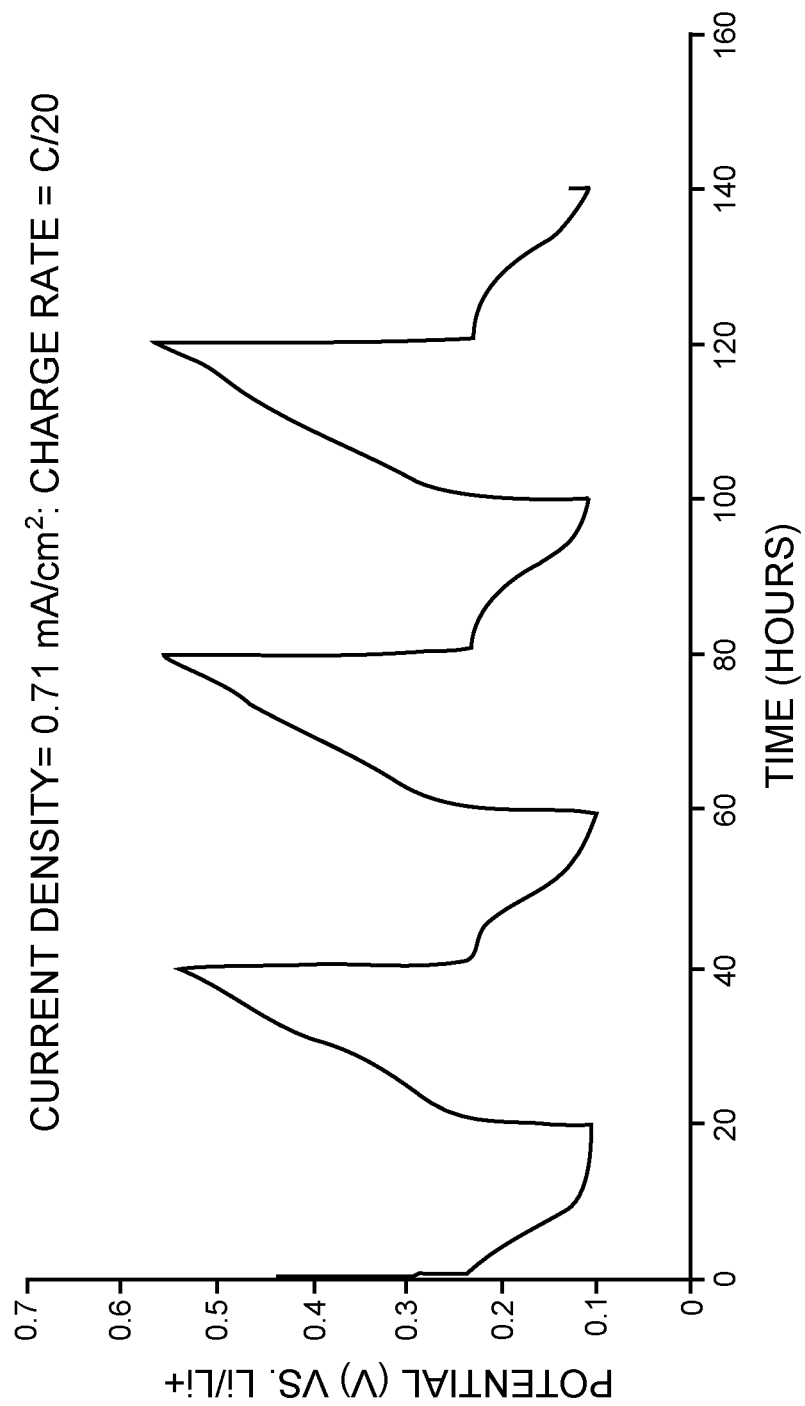
FIG. 7 is a graph of galvanostatic cycling curves depicting potential versus time for the array of posts having highly doped silicon posts (FIG. 1) with a post height H equal to 400 μm.

FIG. 7 is a graph of galvanostatic cycling curves depicting potential versus time for the array of posts 12 having highly doped silicon posts (FIG. 1) with a post height H equal to 400 μm. In exemplary testing, the first electrode 10 is an anode. Galvanostatic cycling of the array of posts 12 shows repeatable cycling performance and high energy density of 14.2 mAh/cm². During the first three cycles, at 0.25 mA/cm² corresponding to C/50 rate (50 hours to charge 10% of the total lithium storage capacity of silicon), approximately 20% of irreversible lithiation is observed is believed to be due to the formation of solid electrolyte interface (SEI). After the initial three cycles, at a relatively high charge/discharge rate of up to 2.8 mA/cm², the coulombic efficiency of the array of posts was highly reversible. When combined with a cathode that fills the remaining volume of the microbattery 22 and has 400 mAH/cm² energy density, the areal energy density of the charged microbattery 22 will reach 42 mWh/cm² and the volumetric energy density will reach 850 mWh/cm³ assuming 3V of working voltage.

Figure 8:
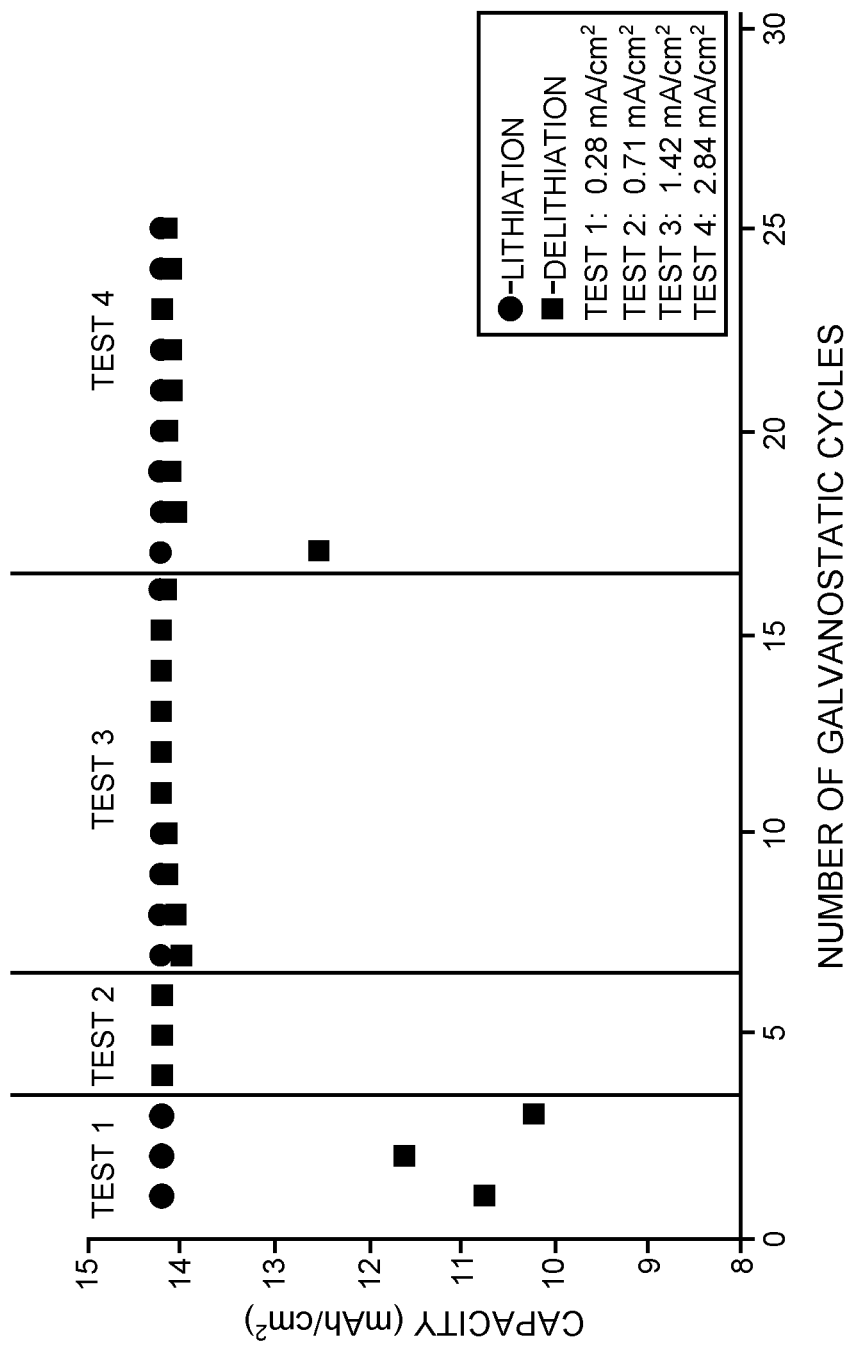
FIG. 8 is a graph of capacity versus cycles for the array of posts having highly doped silicon posts (FIG. 1) of various rates of charging and discharging.

FIG. 8 is a graph of capacity versus galvanostatic cycles for the array of posts 12 at various cycling rates. Lithiation data points are represented by solid circles and delithiation data points are represented by solid squares. Capacity represented by the lithiation data points is generally maintained at a constant level over multiple cycles for the four microbattery test samples. Capacity represented by the delithiation data points is also generally constant with the exception of the initial three cycles. In some embodiments, the method for making the microbattery 22 includes cyclic charging and discharging of the array of posts 12 to 10% of 3700 mAH/gram.

Figure 9:
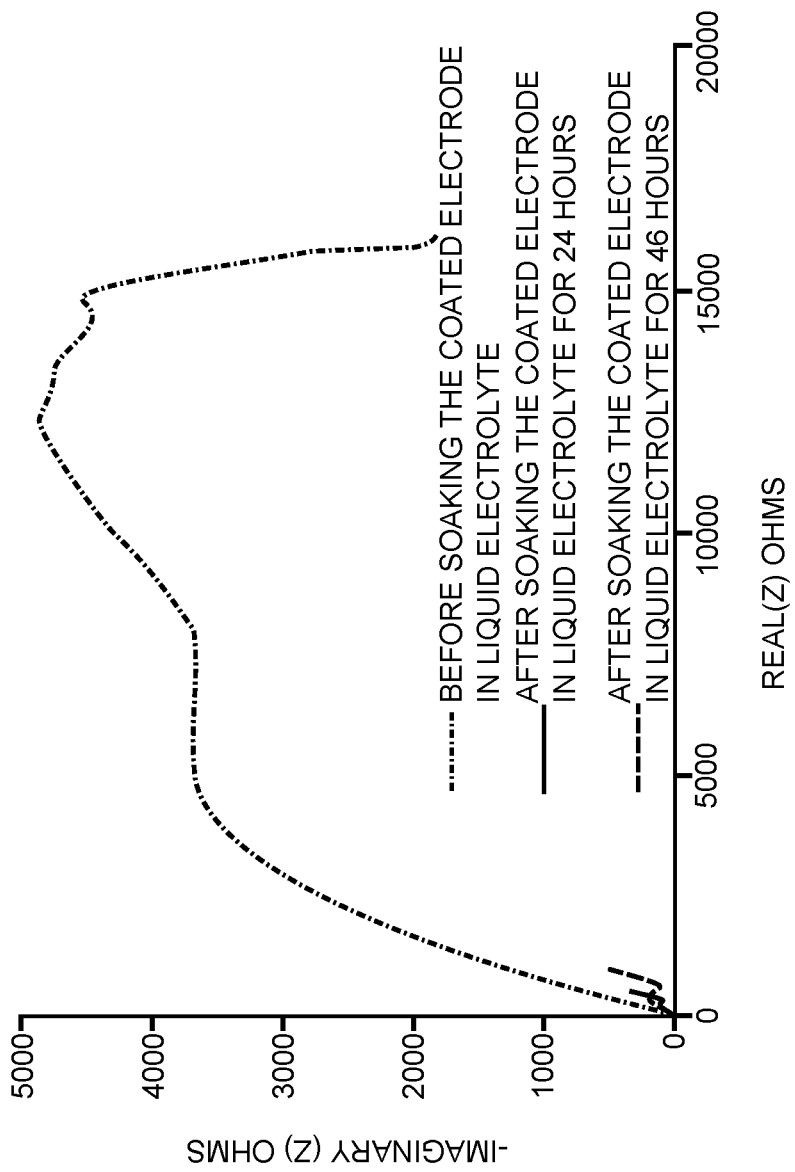
FIG. 9 is a graph of impedance spectroscopy for the coated electrode having a coating of selectively-cured electrolyte.

FIG. 9 is a graph of impedance spectroscopy for the coated electrode 18 (FIG. 2) having a coating of selectively-cured electrolyte 20. In particular, this graph depicts the relatively high impedance presented by the coated electrode 18 before being soaked in a liquid electrolyte. In this particular test, the array of posts 12 were made of highly doped silicon and had coating of a selectively-cured electrolyte 20 with a post coating thickness $T_x$ of 10 μm. The selectively-cured electrolyte 20 in this exemplary embodiment was SU-8 3010.

Figure 10:
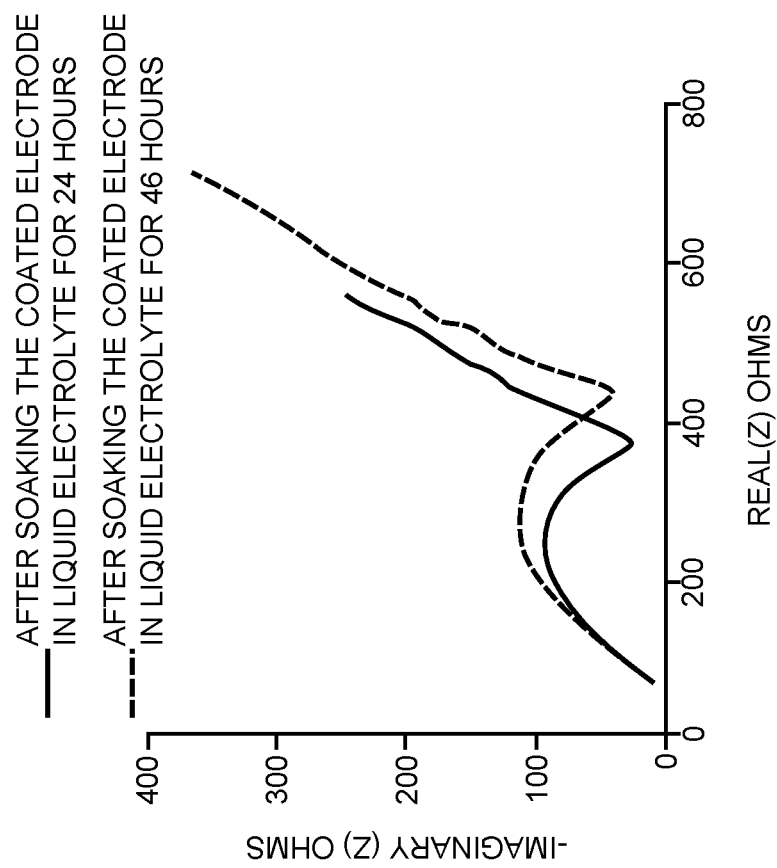
FIG. 10 is a zoomed graph of the impedance spectroscopy for the coated electrode having a coating of selectively-cured electrolyte after soaking in liquid electrolyte.

FIG. 10 is a zoomed graph of the impedance spectroscopy for the coated electrode 18 having a coating of selectively-cured electrolyte after soaking the coated electrode 18 in liquid electrolyte. In this case, the liquid electrolyte was 1M $LiClO_4$ in 50:50 ethylene carbonate and dimethyl carbonate by weight percent. Li+ ion conductivity increased substantially after soaking the coated electrode 18 in the liquid electrolyte. Before soaking the coated electrode 18 in liquid electrolyte, the conductivity was $1.2 \times 10^{-7}$ siemens per centimeter (S/cm). After soaking the coated electrode 18 in liquid electrolyte, the conductivity increased to $4.7 \times 10^{-6}$ S/cm.

Figure 11:
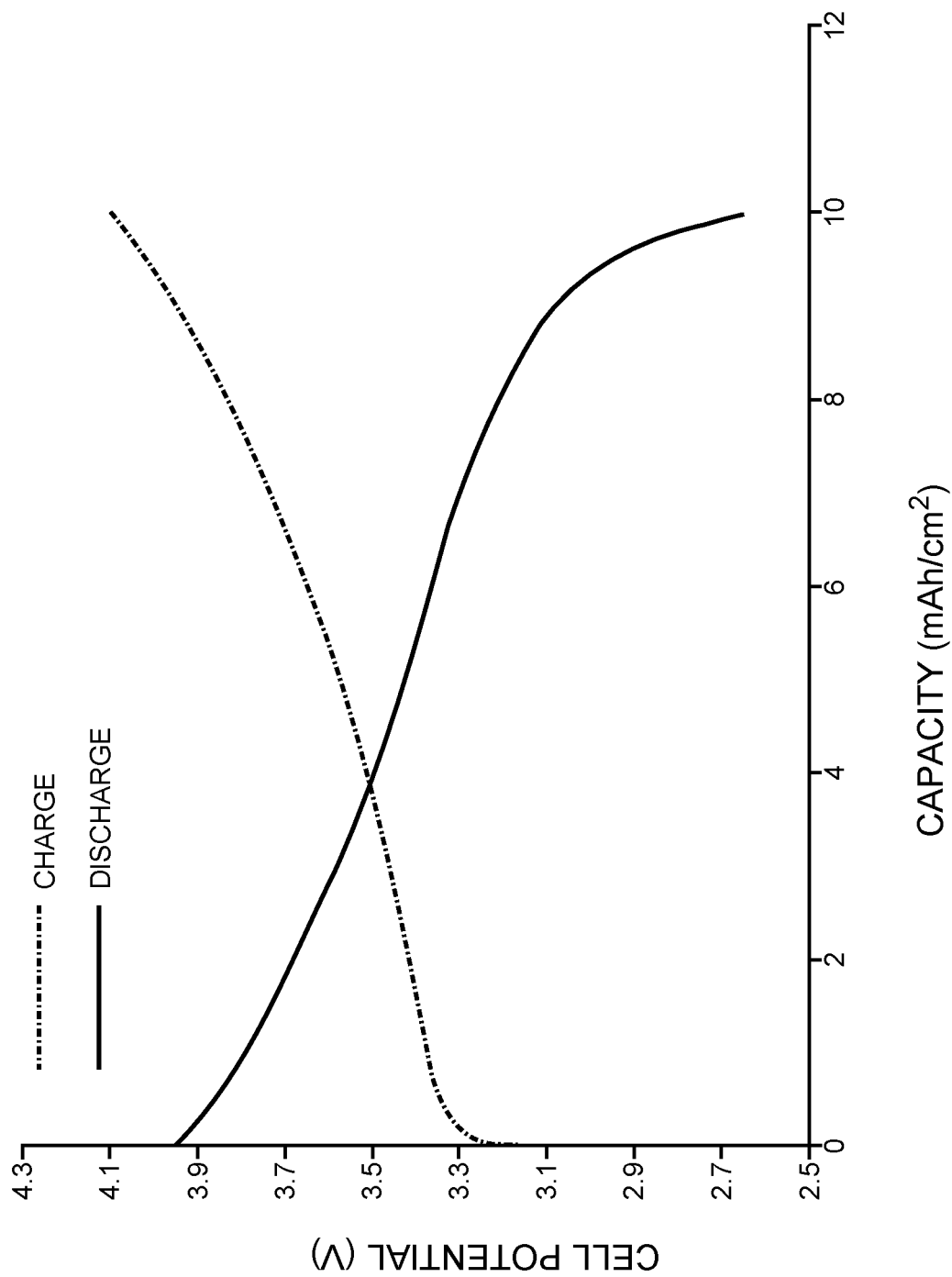
FIG. 11 is a graph of charge and discharge curves for an exemplary embodiment of the microbattery of the present disclosure.

FIG. 11 is a graph of charge and discharge curves for an exemplary embodiment of microbattery 22 with a post height of 400 μm (FIG. 3). In particular, the graph depicts charge and discharge curves for electrical potential versus battery capacity. The relatively high performance depicted in FIG. 11 which is achieved for a microbattery 22 with just a few square millimeters of footprint area can easily be scaled up to larger sizes, on the order of a few square centimeters. The microbattery can also be fabricated in complex shapes such as a T-shape and an L-shape thereby increasing the amount of energy that can be stored in small devices. In these and other geometries, the length of the first electrode can be substantially unequal from the width of the first electrode.

A plurality of the microbattery 22 can be manufactured on a chip and connected in series and/or parallel to meet higher power requirements to power not only microelectronics, but larger consumer electronics as well. For instance, a plurality of the microbattery 22 having a total height $H_T$ of 600 μm can be stacked vertically to make up a 3 mm×3 mm×3 mm cubic battery with an energy density of 85.2 mAh/cm². The volumetric energy density of the microbattery 22 is 2-3 times higher than the volumetric energy density of coin cells without stacking a plurality of the microbattery 22. A plurality of microbattery 22 can also be assembled into larger structures with beneficial macroscopic properties, such as mechanical flexibility.

Those skilled in the art will recognize improvements and modifications to the preferred embodiments of the present disclosure. All such improvements and modifications are considered within the scope of the concepts disclosed herein and the claims that follow.

What is claimed is:

1. A microbattery comprising:
   a substrate having a surface;
   an array of posts extending from the surface of the substrate to form a first electrode;
   a selectively-cured electrolyte that forms a conformal coating over the surface of the substrate and the array of posts to provide a coated electrode, wherein the selectively-cured electrolyte is a cured photoresist that comprises bisphenol A Novolac epoxy; and
   a second electrode that substantially encases the coated electrode.

2. The microbattery of claim 1 wherein the selectively-cured electrolyte is a cured negative photoresist comprised of crosslinked epoxy.

3. The microbattery of claim 1 wherein an organic solvent of the bisphenol A Novolac epoxy is cyclopentanone.

4. The microbattery of claim 1 wherein the first electrode is made of silicon.

5. The microbattery of claim 1 wherein the first electrode has an electrical resistivity that ranges from around 0.001 Ω-cm to about 0.005 Ω-cm.

6. The microbattery of claim 1 wherein the first electrode has an electrical resistivity that ranges from 0.005 Ω-cm to about 0.1 Ω-cm.

7. The microbattery of claim 1 wherein the first electrode has an electrical resistivity that ranges from 0.1 Ω-cm to about 20 Ω-cm.

8. The microbattery of claim 1 wherein the first electrode is made of a lithium-storing metallic alloy.

9. The microbattery of claim 1 wherein the selectively-cured electrolyte is soaked in liquid electrolyte to increase ionic conductivity of the selectively-cured electrolyte.

10. The microbattery of claim 1 wherein the selectively-cured electrolyte includes pores in the range of 1 nm to about 10 nm to allow ingress of liquid electrolytes.

11. The microbattery of claim 1 wherein the selectively-cured electrolyte includes pores in the range of 10 nm to 100 nm to allow ingress of liquid electrolytes.

12. The microbattery of claim 1 wherein the second electrode comprises a composite mixture of active lithium-storage materials, ionically conducting materials, and electrically conductive materials.

13. The microbattery of claim 1 wherein the first electrode is made of germanium.

14. The microbattery of claim 1 wherein an areal energy density of around 42 mWh/cm$^2$ with around a 3 V working voltage is stored by the microbattery.

15. The microbattery of claim 1 wherein a volumetric energy density of around 850 mWh/cm$^3$ with around a 3 V working voltage is stored by the microbattery.

16. The microbattery of claim 1 wherein the array of posts has a pitch between posts that ranges from around 20 μm to around 2000 μm.

17. The microbattery of claim 16 wherein the pitch between posts has a minimum value that is around twice a diameter of each post making up the array of posts.

18. The microbattery of claim 1 wherein a diameter of each post of the array of posts ranges from about 10 μm to about 100 μm.

19. The microbattery of claim 1 wherein a diameter of each post of the array of posts ranges from 100 μm to about 300 μm.

20. The microbattery of claim 1 wherein a diameter of each post of the array of posts ranges from 300 μm to about 500 μm.

21. The microbattery of claim 1 wherein a diameter of each post of the array of posts ranges from 500 μm to about 1000 μm.

22. The microbattery of claim 1 wherein each post of the array of posts ranges in height from around 350 μm to around 450 μm.

23. The microbattery of claim 1 wherein each post of the array of posts ranges in height from around 100 μm to about 350 μm.

24. The microbattery of claim 1 wherein each post of the array of posts ranges in height from 350 μm to around 1000 μm.

25. The microbattery of claim 1 wherein a length of the first electrode and a width of the first electrode both range from about 1 mm to around 10 mm.

26. The microbattery of claim 1 wherein a length of the first electrode and a width of the first electrode both range from 10 mm to around 100 mm.

27. The microbattery of claim 1 wherein geometries of the first electrode include shapes in which a length of the first electrode is substantially unequal from a width of the first electrode.

28. A method for making a microbattery comprising:
   providing a substrate;
   fabricating an array of posts into the substrate to form a first electrode and leaving an etched surface about the array of posts;
   coating the array of posts and the etched surface with a conformal coat of selectively-curable electrolyte;
   curing the selectively-curable electrolyte to form a selectively cured electrolyte, wherein the selectively cured electrolyte is a cured photoresist that comprises bisphenol A Novolac epoxy; and
   providing a second electrode that substantially encases the array of posts.

29. The method of making the microbattery of claim 28 wherein fabricating the array of posts is achieved by way of etching.

30. The method of making the microbattery of claim 29 further comprising patterning the substrate with an etch resist pattern of the array of posts before etching.

31. The method of making the microbattery of claim 29 wherein etching the array of posts is performed using deep-reactive ion etching (DRIE).

32. The method of making the microbattery of claim 28 further including cyclic charging and discharging the array of posts to 10% of 3700 mAh/gram.

33. The method of making the microbattery of claim 28 wherein the substrate has an electrical resistivity that ranges from around 0.001 Ω-cm to around 0.005 Ω-cm.

34. The method of making the microbattery of claim 28 wherein the first electrode has an electrical resistivity that ranges from 0.005 Ω-cm to about 0.1 Ω-cm.

35. The method of making the microbattery of claim 28 wherein the first electrode has an electrical resistivity that ranges from 0.1 Ω-cm to about 20 Ω-cm.

36. The method of making the microbattery of claim 28 further including soft baking a conformal coat of selectively-cured electrolyte before subjecting the energy-curable electrolyte to energy.

37. The method of making the microbattery of claim 28 wherein energy used to cure the selectively-curable electrolyte is ultra-violet (UV) light.

38. The method of making the microbattery of claim 28 wherein energy used to cure the selectively-curable electrolyte is heat energy.

39. The method of making the microbattery of claim 28 wherein chemical reaction curing is used to cure the selectively-curable electrolyte.

40. The method of making the microbattery of claim 28 wherein the selectively-curable electrolyte is a negative photoresist.

41. The method of making the microbattery of claim 28 further including soaking the array of posts with selectively-cured electrolyte in a liquid electrolyte.

42. The method of making the microbattery of claim 41 wherein the liquid electrolyte is propylene carbonate that contains 1 molar lithium perchlorate ($LiClO_4$).

43. The method of making the microbattery of claim 28 wherein the second electrode comprises a composite mixture of active lithium-storage materials, ionically conducting materials, and electrically conductive materials.

44. The method of making the microbattery of claim 28 wherein the selectively-cured electrolyte is cured from a negative photoresist that originally comprises bisphenol A Novolac epoxy dissolved in an organic solvent.

45. The method of making the microbattery of claim 44 wherein the organic solvent is cyclopentanone.

46. The method of making the microbattery of claim 28 wherein the first electrode is made of a lithium-storing metallic alloy.

47. The method of making the microbattery of claim 28 wherein the selectively-cured electrolyte includes pores in a range of 1 nm to about 10 nm to allow ingress of liquid electrolytes.

48. The method of making the microbattery of claim 28 wherein the selectively-cured electrolyte includes pores in a range of 10 nm to 100 nm to allow ingress of liquid electrolytes.

49. The method of making the microbattery of claim 28 wherein the first electrode is made of silicon.

50. The method of making the microbattery of claim 28 wherein the first electrode is made of germanium.

51. The method of making the microbattery of claim 28 wherein an areal energy density of around 42 mWh/cm$^2$ with around a 3 V working voltage is stored by the microbattery.

52. The method of making the microbattery of claim 28 wherein a volumetric energy density of around 850 mWh/cm$^3$ with around a 3 V working voltage is stored by the microbattery.

53. The method of making microbattery of claim 28 wherein the array of posts has a pitch between posts that ranges from around 20 μm to around 2000 μm.

54. The method of making microbattery of claim 53 wherein the pitch between posts has a minimum value that is around twice a diameter of each post making up the array of posts.

55. The method of making the microbattery of claim 28 wherein a diameter of each post of the array of posts ranges from about 10 μm to about 100 μm.

56. The method of making the microbattery of claim 28 wherein a diameter of each post of the array of posts ranges from 100 μm to about 300 μm.

57. The method of making the microbattery of claim 28 wherein a diameter of each post of the array of posts ranges from 300 μm to about 500 μm.

58. The method of making the microbattery of claim 28 wherein a diameter of each post of the array of posts ranges from 500 μm to about 1000 μm.

59. The method of making the microbattery of claim 28 wherein each post of the array of posts ranges in height from around 350 μm to around 450 μm.

60. The method of making the microbattery of claim 28 wherein each post of the array of posts ranges in height from around 100 μm to about 350 μm.

61. The method of making the microbattery of claim 28 wherein each post of the array of posts ranges in height from 350 μm to around 1000 μm.

62. The method of making the microbattery of claim 28 wherein a length of the first electrode and a width of the first electrode both range from about 1 mm to around 10 mm.

63. The method of making the microbattery of claim 28 wherein a length of the first electrode and a width of the first electrode both range from 10 mm to around 100 mm.

64. The method of making the microbattery of claim 28 wherein geometries of the first electrode include shapes in which a length of the first electrode is substantially unequal from a width of the first electrode.

* * * * *